United States Patent [19]

Yamashita

[11] Patent Number: 5,734,087
[45] Date of Patent: *Mar. 31, 1998

[54] ACCELERATION SENSOR

[75] Inventor: Muneharu Yamashita, Nafaokakyo, Japan

[73] Assignee: Murata Manufacturing Co., Ltd., Kyoto-fu, Japan

[*] Notice: The term of this patent shall not extend the expiration date of Pat. No. 5,438,859.

[21] Appl. No.: 724,921

[22] Filed: Oct. 2, 1996

Related U.S. Application Data

[63] Continuation of Ser. No. 359,413, Dec. 20, 1994, abandoned.

[30] Foreign Application Priority Data

Jun. 23, 1994 [JP] Japan .................... 6-141676

[51] Int. Cl.⁶ .................... G01L 25/00; G01P 15/09
[52] U.S. Cl. .................... 73/1.15; 73/1.38; 73/514.34
[58] Field of Search .................... 73/1.15, 1.38, 73/514.34

[56] References Cited

U.S. PATENT DOCUMENTS

| | | | |
|---|---|---|---|
| 3,786,348 | 1/1974 | Lynas et al. | 324/56 |
| 4,537,065 | 8/1985 | Ootsuka et al. | 73/117.3 |
| 4,816,743 | 3/1989 | Harms et al. | 324/56 |
| 4,950,914 | 8/1990 | Kurihara et al. | 73/514.34 |
| 5,004,985 | 4/1991 | Holroyd et al. | 324/727 |
| 5,438,859 | 8/1995 | Yamashita et al. | 73/1 D |

FOREIGN PATENT DOCUMENTS

| | | |
|---|---|---|
| 0534366 | 3/1993 | European Pat. Off. |
| 3334603 | 9/1983 | Germany. |
| 2239096 | 6/1991 | United Kingdom. |

OTHER PUBLICATIONS

European Search Report dated Oct. 27, 1995.
"Electronics Engineer's Reference Book", Sixth Edition, Edited by FF Mazda 1989, pp. 33/7–33/8; 37/9–37/12.

Primary Examiner—Hezron E. Williams
Assistant Examiner—Richard A. Moller
Attorney, Agent, or Firm—Ostrolenk, Faber, Gerb & Soffen, LLP

[57] ABSTRACT

An acceleration sensor includes a piezoelectric ceramic element (1) for detecting acceleration, a signal processing circuit (2) for processing an output signal received from the piezoelectric ceramic element (1), and a self-diagnosing circuit (20) which is connected in series with the piezoelectric ceramic element (1). The self-diagnosing circuit (20) is provided with a PNP transistor having an emitter (E) which is connected to a source voltage $V_{cc}$, a base which is supplied with an externally inputted timing pulse signal, and a collector for outputting a failure diagnosing signal which is synchronized with the timing pulse signal. Further, a self-diagnosing capacitor (25) is provided between the collector of the PNP transistor (23) and the piezoelectric ceramic element (1).

3 Claims, 2 Drawing Sheets

ACCELERATION SENSOR

This is a Continuation of application Ser. No. 08/359,413, filed on Dec. 20, 1994, now abandoned.

BACKGROUND OF THE INVENTION

1. Field of the Invention

The present invention relates to an acceleration sensor which is built into an on-vehicle air bag or the like.

2. Description of the Background Art

FIG. 2 illustrates an exemplary circuit structure of a conventional acceleration sensor. This acceleration sensor comprises a piezoelectric ceramic element 1 for detecting an action of acceleration, a signal processing circuit 2 for processing an output signal from the piezoelectric ceramic element 1, and a self-diagnosing circuit 3 which is connected in series with the piezoelectric ceramic element 1. Further, the signal processing circuit 2 is formed by an impedance converter circuit 4 for impedance-converting the output signal from the piezoelectric ceramic element 1, a filter circuit 5 for removing unnecessary components from the output signal, and an amplifier circuit 6 for amplifying only necessary components in the output signal. A temperature compensating capacitor 7 and a leak resistance 8 are provided between the piezoelectric ceramic element 1 and the impedance converter circuit 4 of the signal processing circuit 2. First ends of the piezoelectric ceramic element 1, the temperature compensating capacitor 7 and the leak resistance 8 are set at a reference potential (hereinafter referred to as "ground voltage"), while second ends thereof are connected in common. An external output terminal 9 is provided on an output end of the amplifier circuit 6 of the signal processing circuit 2, so that the output signal generated from the piezoelectric ceramic element 1 is processed by the signal processing circuit 2 and thereafter outputted to the exterior through the external output terminal 9 as a sensor output.

The self-diagnosing circuit 3, which is provided for discovering a failure of this acceleration sensor in an early stage, is provided with an NPN transistor 11 serving as a switching element for outputting a failure diagnosing signal in synchronization with an externally supplied timing pulse signal. This NPN transistor 11 has a collector C which is connected to a source voltage $V_{cc}$ of 5 V (volts) d.c. through voltage dividing resistances 12a and 12b, an emitter E which is connected to the ground voltage, and a base B which is connected to an external input terminal 10. Further, the collector C of the NPN transistor 11 is connected to the piezoelectric ceramic element 1 through one voltage dividing resistance 12a and a self-diagnosing circuit capacitor 13.

In order to diagnose a failure with this self-diagnosing circuit 3, a timing pulse signal is inputted to the base B of the NPN transistor 11 through the external input terminal 10. The NPN transistor 11 carries out an ON-OFF control action in synchronization with the timing pulse signal, thereby applying an output signal from the collector C to the piezoelectric ceramic element 1 through the self-diagnosing circuit capacitor 13. The signal processing circuit 2 processes the failure diagnosing signal which is supplied to the piezoelectric ceramic element 1, and outputs the processed signal as a sensor output through the external output terminal 9. Thus, it is possible to judge presence/absence of a failure in the acceleration sensor by checking for a change of the sensor output which is generated from the external output terminal 9.

In this self-diagnosing circuit 3, however, an input line for the source voltage $V_{cc}$ is connected to the piezoelectric ceramic element 1 through the voltage dividing resistance 12b and the self-diagnosing circuit capacitor 13. Upon the supply of power, therefore, the source voltage $V_{cc}$ of 5 V d.c. is instantaneously applied to the piezoelectric ceramic element 1. Consequently, the acceleration sensor is distabilized in its rise characteristic.

The conventional acceleration sensor of this type generally employs a stabilized power source. Even in such a stabilized power source, however, noise may be mixed into its output voltage such that the piezoelectric ceramic element 1 exhibits unstable behavior in response to the self-diagnosing signal which is influenced by this noise. Consequently, the acceleration sensor disadvantageously causes a malfunction or a failure.

SUMMARY OF THE INVENTION

An object of the present invention is to provide an acceleration sensor which can prevent occurrence of a malfunction or a failure resulting from a bad influence exerted by a voltage fluctuation occurring upon the supply of power or noise from a power source.

The acceleration sensor according to the present invention comprises a piezoelectric ceramic element for detecting acceleration, a signal processing circuit for processing an output signal received from the piezoelectric ceramic element and outputting the same to the exterior, and a self-diagnosing circuit which is connected with the piezoelectric ceramic element. Further, the self-diagnosing circuit comprises a switching element having a first electrode to which a source voltage is applied, a second electrode which receives an externally supplied timing pulse signal and a third electrode for outputting a prescribed voltage in synchronization with the timing pulse signal received from the second electrode, and a capacitor which is provided between the third electrode of the switching element and the piezoelectric ceramic element.

In the aforementioned structure, the self-diagnosing circuit is so formed that the source voltage is supplied to the piezoelectric ceramic element through the capacitor and the switching element. Therefore, any voltage fluctuation upon the supply of power, or noise from a power source, is cut off by the switching element, and not directly applied to the piezoelectric ceramic element. Thus, it is possible to protect the piezoelectric ceramic element from unstable behavior caused by voltage fluctuation upon the supply of power or the like.

An acceleration sensor according to a restricted aspect of the present invention is provided with a PNP transistor having first, second and third electrodes which are formed by an emitter, a base and a collector respectively for serving as a switching element of a self-diagnosing circuit.

In the acceleration sensor according to the restricted aspect of the present invention, further, the self-diagnosing circuit is further provided with first and second resistive elements between the third electrode of the switching element and a reference potential source, while a capacitor is provided between the node of the first and second resistive elements and a piezoelectric ceramic element.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
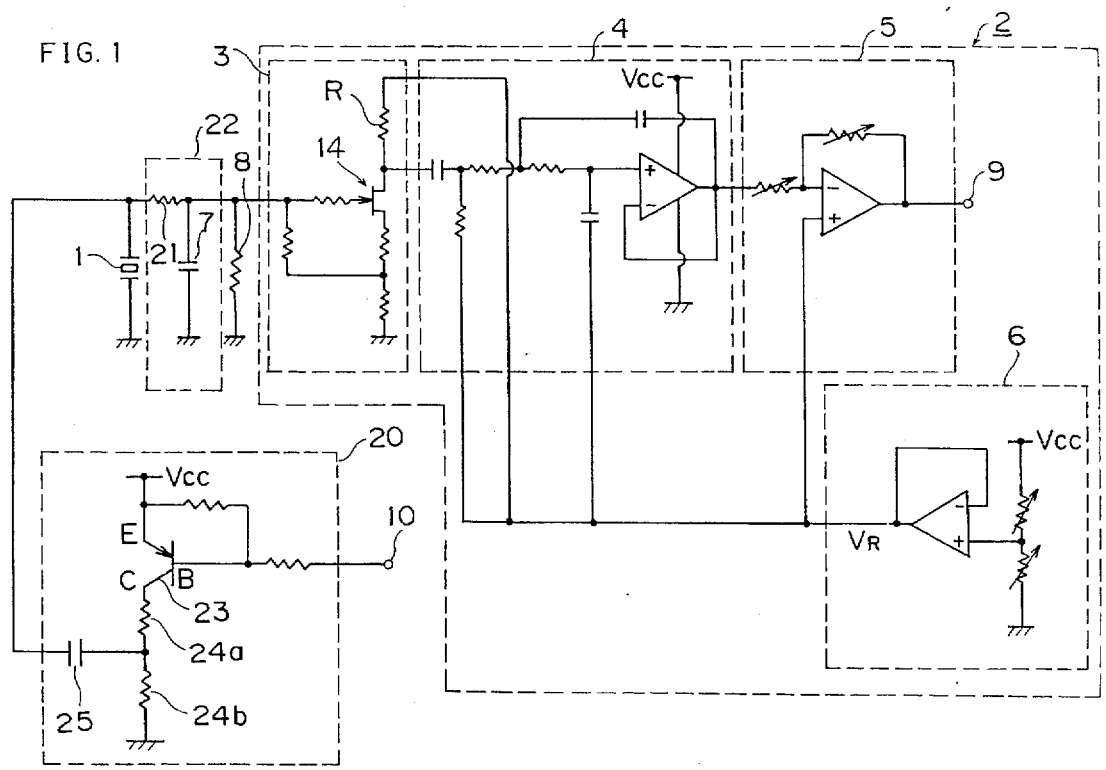
FIG. 1 is a circuit diagram showing the structure of an acceleration sensor according to an embodiment of the present invention.
Figure 2:
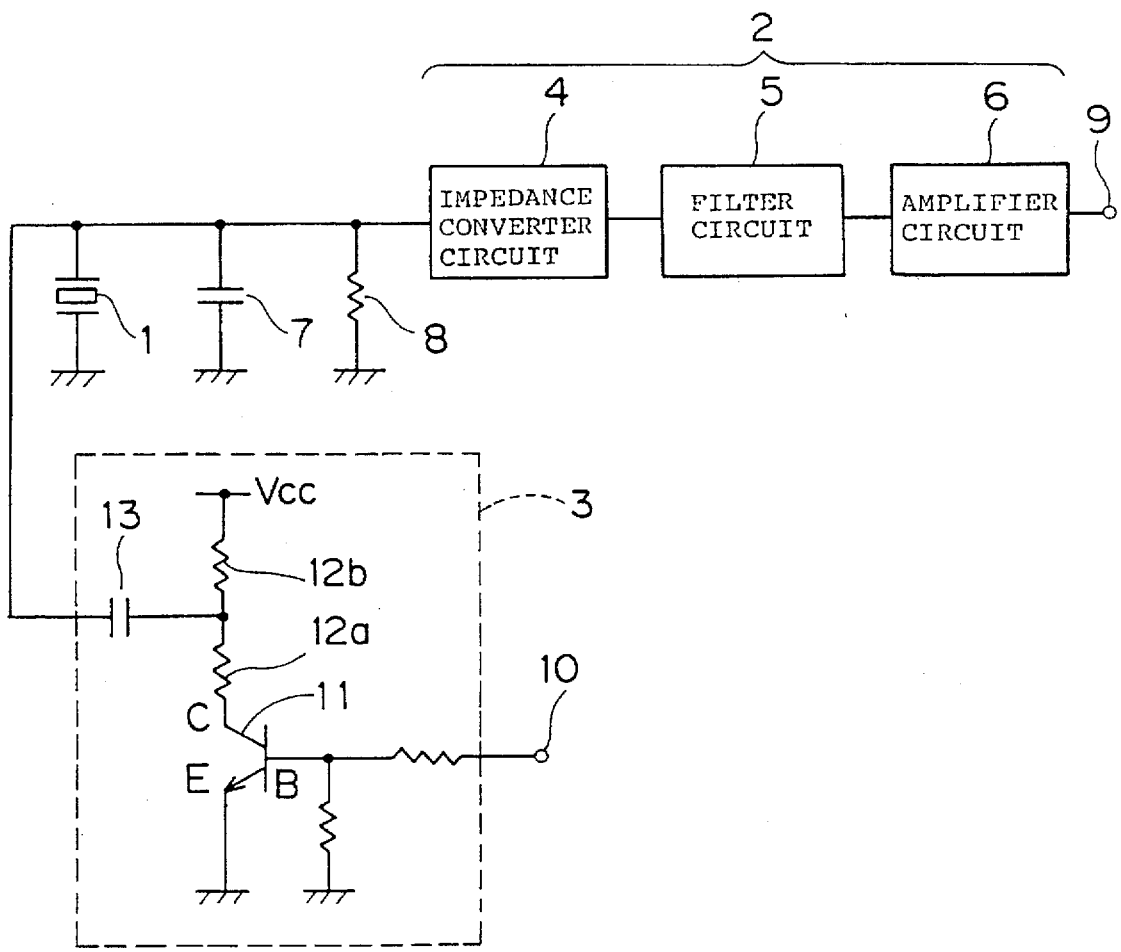
FIG. 2 is a circuit block diagram showing the structure of a conventional acceleration sensor.

Referring to FIG. 1, an acceleration sensor according to an embodiment of the present invention comprises a piezoelectric ceramic element 1 for detecting acceleration, a signal processing circuit 2 for processing an output signal received from the piezoelectric ceramic element 1, and a self-diagnosing circuit 20 which is connected in series with the piezoelectric ceramic element 1. The signal processing circuit 2 is formed by an impedance converter circuit 3 for impedance-converting the output signal received from the piezoelectric ceramic element 1, a filter circuit 4 for removing unnecessary components from the output signal, an amplifier circuit 5 for amplifying only necessary components of the output signal, and a reference voltage generation circuit 6 for generating a reference voltage $V_R$ on the basis of a source voltage $V_{cc}$.

Further, a temperature compensating capacitor 7 and a leak resistance 8 are connected in parallel with each other and a filter resistance 21 is connected in series between the piezoelectric ceramic element 1 and the impedance converter circuit 3. The filter resistance 21 and the temperature compensating capacitor 7 form a temperature compensating/filter circuit 22 of the piezoelectric ceramic element 1. The temperature compensating/filter circuit 22 is adapted to prevent the impedance converter circuit 3 from output saturation or a malfunction caused by an extremely large output signal which is generated when acceleration corresponding to the resonance frequency of the piezoelectric ceramic element 1 acts on the acceleration sensor and inputted in the impedance converter circuit 3. Thus, the temperature compensating/filter circuit 22 acts to reduce the output signal from the piezoelectric ceramic element 1. The filter resistance 21 may be arranged on a ground voltage side of the piezoelectric ceramic element 1 or the temperature compensating capacitor 7.

The impedance converter circuit 3 has an FET (field-effect transistor) 14 for amplifying the output signal received from the piezoelectric ceramic element 1. The reference voltage $V_R$ which is generated from the reference voltage generation circuit 6 is supplied to a source side of the FET 14 through a load resistance R.

The filter circuit 4 is connected to the source side of the FET 14 of the impedance converter circuit 3.

The amplifier circuit 5 is connected to a downstream side of the filter circuit 4, for amplifying an output signal received from the filter circuit 4 and outputting the same from an external output terminal 9.

The reference voltage generation circuit 6 generates the reference voltage $V_R$ on the basis of the source voltage $V_{cc}$, and supplies the same to the filter circuit 4 and the amplifier circuit 5 as an operation reference voltage.

The self-diagnosing circuit 20 comprises a PNP transistor 23 serving as a switching element for outputting a failure diagnosing signal which is synchronized with a timing pulse signal received from the external input terminal 10. The PNP transistor 23 has an emitter E which is connected to the source voltage $V_{cc}$, a collector C which is connected to a ground voltage through voltage dividing resistances 24a and 24b, and a base B which is connected to the external input terminal 10 receiving the timing pulse signal from the exterior. Further, a self-diagnosing capacitor 25 is provided between an output terminal on the collector C side of the PNP transistor 23 and the piezoelectric ceramic element 1.

When the timing pulse signal is inputted in the base B of the PNP transistor 23 from the external input terminal 10 in the aforementioned structure, the PNP transistor 23 carries out an ON-OFF control action in synchronization with the timing pulse signal, to derive the source voltage $V_{cc}$ from the emitter E toward the collector C. Further, an output voltage on the collector C side is adjusted to a prescribed level by the voltage dividing resistances 23a and 24b, and thereafter applied to the piezoelectric ceramic element 1 through the self-diagnosing capacitor 25. Thereafter this voltage is outputted from the external output terminal 9 as a sensor output through the failure diagnosing signal processing circuit 2 which is connected with the piezoelectric ceramic element 1. Thus, presence/absence of a failure in the acceleration sensor is judged by detecting change of the sensor output.

According to this embodiment, the PNP transistor 23 for outputting a failure diagnosing signal is interposed between an input line for the source voltage $V_{cc}$ and the piezoelectric ceramic element 1. Thus, it is possible to prevent the piezoelectric ceramic element 1 from a bad influence directly exerted by a noise in the source voltage $V_{cc}$ or a fluctuation component, which is cut off by the PNP transistor 23.

As to the switching element, the PNP transistor 23 may be replaced by an NPN transistor having a collector which is connected to the source voltage $V_{cc}$, an emitter which is connected to the ground voltage and a base B which is connected to the external input terminal 10 respectively. However, it is preferable to employ the PNP transistor 23, in consideration of the fact that the failure diagnosing signal which is applied to the piezoelectric ceramic element 1 is instabilized due to a temperature characteristic of an emitter-to-base ON-state voltage in a general transistor.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An acceleration sensor comprising:
   a piezoelectric ceramic element which is operable for detecting acceleration;
   a signal processing circuit for processing an output signal being received from said piezoelectric ceramic element and outputting the same to an external output terminal; and
   a self-diagnosing circuit being connected with said piezoelectric ceramic element,
   said self-diagnosing circuit comprising:
   a switching element having a first electrode being supplied with a source voltage, a second electrode for receiving an externally supplied timing pulse signal, and a third electrode for outputting a prescribed self-diagnosing signal in synchronization with said timing pulse signal being received from said second electrode, and
   a capacitor being provided between said third electrode of said switching element and said piezoelectric ceramic elements,
   said signal processing circuit being operable for detecting a failure in the ceramic element in response to said self-diagnosing signal being supplied to said piezoelectric ceramic element.

2. An acceleration sensor in accordance with claim 1, wherein said switching element is formed by a PNP transistor having said first, second and third electrodes being an emitter, a base and a collector respectively.

3. An acceleration sensor in accordance with claim 1 or 2, wherein said self-diagnosing circuit is further provided with first and second resistive elements between said third electrode of said switching element and a reference potential source,
   said capacitor being provided between the node of said first and second resistive elements and said piezoelectric ceramic element.

* * * * *